United States Patent
Murata et al.

(10) Patent No.: US 9,169,769 B2
(45) Date of Patent: Oct. 27, 2015

(54) GAS-FIRED ENGINE (75) Inventors: Satoru Murata, Tokyo (JP); Masaru Oka, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 123 days.

(21) Appl. No.: 13/985,065

(22) PCT Filed: Mar. 15, 2012

(86) PCT No.: PCT/JP2012/056695
§ 371 (c)(1),
(2), (4) Date: Aug. 13, 2013

(87) PCT Pub. No.: WO2012/132931
PCT Pub. Date: Oct. 4, 2012

(65) Prior Publication Data
US 2013/0312408 A1 Nov. 28, 2013

(30) Foreign Application Priority Data

Mar. 31, 2011 (JP) .................................. 2011-081193

(51) Int. Cl.
*F02B 33/44* (2006.01)
*F02B 37/00* (2006.01)
(Continued)

(52) U.S. Cl.
CPC .............. *F02B 37/00* (2013.01); *F02D 19/022* (2013.01); *F02M 21/0215* (2013.01); *F02M 21/0245* (2013.01); *F02M 21/06* (2013.01); *F02B 3/06* (2013.01); *Y02T 10/32* (2013.01)

(58) Field of Classification Search
CPC ... B60L 11/123; B60L 11/14; B60L 11/1816; B60L 11/1861; B60L 11/1868; B60L 2220/12; B60L 2220/14; B60L 2240/486; B60L 11/1853; B60L 11/1862; B60L 11/1864; B60L 15/2054; B60L 1/003
See application file for complete search history.

(56) References Cited

U.S. PATENT DOCUMENTS 3,797,235 A * 3/1974 Eheim ........................ 60/39.281
4,729,225 A   3/1988 Bucher
(Continued)

FOREIGN PATENT DOCUMENTS

JP       62-45923    2/1987
JP       62-111124   5/1987
(Continued)

OTHER PUBLICATIONS

Office Action issued Sep. 1, 2014 in corresponding Chinese patent application No. 201280002387.3 (with English translation).
(Continued)

*Primary Examiner* — Jesse Bogue
(74) *Attorney, Agent, or Firm* — Wenderoth, Lind & Ponack, L.L.P.

(57) ABSTRACT

A gas-fired engine that supplies high-pressure liquefied gas (e.g., LNG) as fuel by a reciprocating pump. A gas fuel supply device includes: a reciprocating pump driven by a hydraulic motor to boost an introduced liquefied gas pressure to a desired pressure and discharge the liquefied gas; a hydraulic oil introduction line that introduces a portion of high-pressure hydraulic oil from a hydraulic oil line and supplies the high-pressure hydraulic oil to the hydraulic motor; a hydraulic oil return line that returns the high-pressure hydraulic oil to the hydraulic oil line; a heating unit that heats and gasifies the boosted liquefied gas; a control section that adjusts a rotational speed of the hydraulic motor to maintain constant a gas fuel outlet pressure of the heating unit; and an engine inlet gas pressure-reducing valve that regulates a gas fuel pressure injected into a combustion chamber.

2 Claims, 4 Drawing Sheets (51) Int. Cl.
*F02M 21/02* (2006.01)
*F02M 21/06* (2006.01)
*F02D 19/02* (2006.01)
*F02B 3/06* (2006.01)

(56) References Cited

U.S. PATENT DOCUMENTS

| | | | |
|---|---|---|---|
| 5,499,615 | A | 3/1996 | Lawrence et al. |
| 5,884,488 | A * | 3/1999 | Gram et al. ............... 62/50.6 |
| 2004/0105759 | A1 | 6/2004 | Gram et al. |
| 2004/0123842 | A1* | 7/2004 | Dandan et al. ............ 123/458 |
| 2004/0231318 | A1* | 11/2004 | Fisher ......................... 60/258 |

FOREIGN PATENT DOCUMENTS

| | | | |
|---|---|---|---|
| JP | 5-215233 | 8/1993 | |
| JP | 5-306769 | 11/1993 | |
| JP | 7-237700 | 9/1995 | |
| JP | 7-277015 | 10/1995 | |
| JP | 7-317541 | 12/1995 | |
| JP | 9-151912 | 6/1997 | |
| JP | 9-209788 | 8/1997 | |
| JP | 11-241660 | 9/1999 | |
| JP | 2000-170908 | 6/2000 | |
| JP | 2002-168201 | 6/2002 | |
| JP | 2002-535194 | 10/2002 | |
| JP | 2003-172161 | 6/2003 | |
| JP | 2005-9432 | 1/2005 | |
| JP | 2005-504927 | 2/2005 | |
| JP | 2006-283736 | 10/2006 | |
| JP | 2006283736 A * | 10/2006 | ............ Y02T 10/32 |
| JP | 2006-348779 | 12/2006 | |
| JP | 2007-146708 | 6/2007 | |
| JP | 2009-126623 | 6/2009 | |
| JP | 2009-204026 | 9/2009 | |
| JP | 2011-7094 | 1/2011 | |
| JP | 2011-57048 | 3/2011 | |
| JP | 2011-149327 | 8/2011 | |
| WO | WO 2007115579 A2 * | 10/2007 | ............ F02G 5/02 |

OTHER PUBLICATIONS

Japanese Notification issued Sep. 9, 2014 in corresponding Japanese patent application No. 2011-081193 (with English translation).
Notice of Allowance issued Nov. 17, 2014 in corresponding Korean patent application No. 10-2013-7003635.
Office Action issued on Mar. 30, 2014 in corresponding Korean patent application No. 2013-7003635.
International Search Report issued Jun. 5, 2012 in International Application No. PCT/JP2012/056695.
Written Opinion of the International Searching Authority issued Jun. 5, 2012 in International Application No. PCT/JP2012/056695.
Masahide Sugihara et al., "Creating a whole range of benefits with the Mitsubishi UEC Eco-Engine", International Council on Combustion Engines, Paper No. 75, CIMAC Congress 2007, Vienna, pp. 1-10.
Office Action issued Feb. 24, 2015 in corresponding Japanese patent application No. 2011-081193 (with English translation).
Notification issued Jun. 2, 2015 in corresponding Japanese patent application No. 2011-081193 (with English translation).
"2007 Steel Vessel Regulations, Steel Vessel Regulations Inspection Rules, Part H, Electric Facility", Nippon Kaiji Kyokai, Printed and Issued in Apr. 2007, p. 488.
"Basis for Liquefied Gas and Chemical Tanker", Seizando-Shoten Publishing Co., Ltd., First Edition published on Sep. 18, 1983, pp. 72-75.
Decision to Grant a Patent issued Aug. 11, 2015 in corresponding Japanese patent application No. 2011-081193.

* cited by examiner

GAS-FIRED ENGINE

TECHNICAL FIELD

The present invention relates to a gas-fired engine which is applied to, for example, main engines or generator drive engines of vessels, and operated with gas fuel such as natural gas as fuel.

BACKGROUND ART

There are various conventional diesel engines which are operated with natural gas obtained by gasifying liquefied natural gas (referred to as "LNG" below) as fuel. In recent years, slow-speed two-stroke diesel engines with high-pressure gas injection (referred to as "SSD-GI" below) are attracting attention as a measure to improve the environmental emission efficiency of existing oil-fired slow-speed diesel main engines. The SSD-GI is an engine having higher thermal efficiency and higher response than a conventional heat engine using LNG (e.g., a steam turbine), and capable of outputting power at low speed. The SSD-GI can be driven in direct connection with a propeller.

However, unlike the proven oil-fired diesel engines, a high-pressure injection technique for supplying high-pressure natural gas (about 150 to 300 bar) into a combustion chamber has not been sufficiently developed for the SSD-GI which uses natural gas as fuel. There appears to be no established technique for supplying LNG fuel.

When the SSD-GI was considered as a potential main engine for LNG vessels, a method for using boil off gas (referred to as "BOG" below) as engine fuel by compressing BOG having a substantially atmospheric pressure by a multi-stage gas compressor and cooling the BOG during or after the compressing process was studied. However, the method of compressing and cooling BOG has a disadvantage that a large facility is required and large power is consumed.

For example, PTL 1 described below (see FIG. 7 or the like) discloses a configuration in which BOG in a gas tank is compressed in two stages by low-pressure and high-pressure compressors and introduced into an engine chamber as a propulsion engine for LNG-operated vessels.

Meanwhile, recently, a BOG re-liquefaction system has been achieved in LNG vessels. Thus, BOG does not need to be used as fuel, and can be liquefied and stored. In conventional LNG vessels, there has been an effort to develop a method for using BOG as fuel from the perspective of effective use of BOG. However, the problem in employing LNG as the main fuel of a main engine has been almost solved because of the BOG re-liquefaction system. In a case in which LNG is used as fuel in vessels other than the LNG vessels, no BOG treatment is required when a pressurized LNG tank is employed.

Based on such background, LNG with excellent environmental emission efficiency is recently attracting attention as the fuel of a marine main engine or the like. Various researches and developments have been carried out to develop a method for using LNG or the like.

As a method for supplying natural gas as fuel by high-pressure injection, LNG may be heated and gasified after the pressure is boosted to a high pressure. To boost the pressure of LNG, a reciprocating pump is typically used. The reciprocating pump, which has a rotational speed of about 300 rpm, is much slower than a general electric motor, which has a rotational speed of 1800 to 3600 rpm. Thus, when the reciprocating pump is driven by the electric motor, a speed reduction mechanism is required to reduce the rotational speed to that of the reciprocating pump.

A geared or pulley speed reduction mechanism has been known as a typical speed reduction mechanism used for operating the reciprocating pump. The geared speed reduction mechanism is a speed reduction mechanism which combines a plurality of gears with different teeth numbers. The pulley speed reduction mechanism has a structure in which large and small wheels coupled via a V belt are rotated.

In a plant for re-gasification of liquefied gas, the pressure of liquefied gas removed from a storage tank is boosted to a high pressure by a pump in a liquid state as disclosed in, for example, PTL 2 described below.

In marine diesel engines, electronically-controlled engines with high environmental responsiveness which can reduce nitrogen oxides emissions or the like have been recently developed in response to a worldwide tightening of regulations on exhaust emissions from marine engines. In the electronically-controlled engines, the driving of at least one of a fuel injection system, an exhaust valve train system, a start-up system, and a cylinder lubrication system, which are driven by a camshaft in conventional engines, is electronically controlled. The electronically-controlled engines employ a method of controlling high-pressure hydraulic oil by a controller and an electromagnetic valve and thereby driving respective units of the engine.

CITATION LIST

Patent Literature

{PTL 1}
Japanese Unexamined Patent Application, Publication No. Hei9-209788
{PTL 2}
Japanese Unexamined Patent Application, Publication No. 2009-204026

SUMMARY OF INVENTION

Technical Problem

As described above, while the LNG is recently attracting attention as the fuel of a marine main engine, there has been no established technique for supplying high-pressure gas so as to inject high-pressure natural gas into a combustion chamber. To inject high-pressure natural gas as engine fuel, it is considered necessary to boost the pressure of LNG by the reciprocating pump. Following problems in controlling the driving of the reciprocating pump have been pointed out. To be more specific, when the electric motor is used as a drive source of the reciprocating pump by employing an operating method of reducing the rotational speed of the electric motor to that of the reciprocating pump via the speed reduction mechanism, the following problems occur in the speed reduction mechanism and the electric motor.

The first problem relates to the speed reduction mechanism required in driving the electric motor for the reciprocating pump.

To be more specific, the geared speed reduction mechanism is expected to suffer damage at tooth surfaces or roots of the gears due to torque variation from the reciprocating pump side. In consideration of durability against long-term continuous operation, it is necessary to provide a coupling such as an elastic coupling and an inertia wheel so as to absorb the torque variation.

Meanwhile, the pulley speed reduction mechanism has an advantage that torque variation specific to a piston pump can be absorbed by belt slip. However, since the belt is an expendable item and needs to be replaced within a short period of time, the pulley speed reduction mechanism is not suitable for long-term continuous use. Since sparks may be generated in an exposed high-speed contact portion, the pulley speed reduction mechanism is not preferably installed in a gas hazardous area for safety reasons.

The second problem relates to the electric motor that drives the reciprocating pump.

To be more specific, when the rotational speed of the electric motor is reduced to the rotational speed of the reciprocating pump by the speed reduction mechanism, a frequency control mechanism (an inverter) is required in both the cases in which the geared speed reduction mechanism is employed and the pulley speed reduction mechanism is employed. However, the frequency control mechanism of the electric motor has poor accuracy at low frequency, and thus, is not preferably used in a wide control range in which high accuracy control is required even in a very low-speed rotation region.

In a case in which electric devices such as the electric motor are installed in a gas hazardous area, there are restrictions on usable devices. Thus, there are also restrictions on installation of the reciprocating pump driven by the electric motor in a gas hazardous area.

The present invention has been made to solve the aforementioned problems, and it is an object thereof to provide a gas-fired engine which can supply liquefied gas (e.g., LNG) as fuel by boosting the pressure of liquefied gas to a high pressure by a reciprocating pump that can be easily arranged in a gas hazardous area in a high-pressure injection technique applied to a high-pressure gas injection diesel engine, such as an electronically-controlled slow-speed two-stroke diesel engine with high-pressure gas injection, which supplies high-pressure fuel gas (e.g., natural gas) into a combustion chamber.

Solution to Problem

To achieve the above object, the present invention employs the following solutions.

A gas-fired engine according to a first aspect of the present invention is a gas-fired engine for a high-pressure gas injection diesel engine including an electronic control unit that drives an engine by controlling high-pressure hydraulic oil by a controller and an electromagnetic valve, and a gas fuel supply device that boosts a pressure of liquefied gas as fuel gas to a high pressure and supplies the fuel gas into a combustion chamber by injection, wherein the gas fuel supply device includes: a reciprocating pump that is driven by a hydraulic motor to boost a pressure of liquefied gas introduced thereto to a desired pressure and discharge the liquefied gas; a hydraulic oil introduction line that introduces a portion of the high-pressure hydraulic oil from a hydraulic oil line of the electronic control unit, supplies the high-pressure hydraulic oil to the hydraulic motor, and thereby drives the hydraulic motor; a hydraulic oil return line that returns the high-pressure hydraulic oil used for driving the hydraulic motor to the hydraulic oil line; a heating unit that heats and gasifies the boosted liquefied gas supplied from the reciprocating pump; a control section that adjusts a rotational speed of the hydraulic motor to maintain constant a gas fuel outlet pressure of the heating unit; and an engine inlet gas pressure reducing valve that regulates a pressure of gas fuel to be injected into the combustion chamber.

In the gas-fired engine according to the first aspect, the gas fuel supply device includes: the reciprocating pump that is driven by the hydraulic motor to boost the pressure of liquefied gas introduced thereto to a desired pressure and discharge the liquefied gas; the hydraulic oil introduction line that introduces a portion of the high-pressure hydraulic oil from the hydraulic oil line of the electronic control unit, supplies the high-pressure hydraulic oil to the hydraulic motor, and thereby drives the hydraulic motor; the hydraulic oil return line that returns the high-pressure hydraulic oil used for driving the hydraulic motor to the hydraulic oil line; the heating unit that heats and gasifies the boosted liquefied gas supplied from the reciprocating pump; the control section that adjusts the rotational speed of the hydraulic motor to maintain constant the gas fuel outlet pressure of the heating unit; and the engine inlet gas pressure reducing valve that regulates the pressure of gas fuel to be injected into the combustion chamber. Accordingly, the pressure of the liquefied gas can be boosted by the reciprocating pump driven by the hydraulic motor with a minimum number of additional devices by effectively using the high-pressure hydraulic oil of the electronic control unit.

In the gas-fired engine as described above, the number of rotations of the engine increases with an increase in engine load. Thus, an engine-driving hydraulic pump that supplies the high-pressure hydraulic oil to the electronic control unit also has a higher discharge rate and a higher hydraulic pressure. For the reciprocating pump for boosting the pressure of liquefied gas in which a higher flow rate and a higher pressure are required when the consumption of fuel (gasified liquefied gas) increases, the high-pressure hydraulic oil of the electronic control unit is a favorable hydraulic power source.

In the gas-fired engine according to the first aspect, the rotational speed of the hydraulic motor may be controlled by adjusting a discharge rate of a hydraulic pump that supplies the high-pressure hydraulic oil to the electronic control unit. That is, since the rotational speed of the hydraulic motor that drives the reciprocating pump is controlled by performing capacity control (oil control) of the hydraulic pump that supplies the high-pressure hydraulic oil to the electronic control unit, it is not necessary to additionally provide a speed reduction mechanism or additionally control the number of rotations of an electric motor.

The reciprocating pump driven by the hydraulic motor, and a hydraulic pump unit that supplies a hydraulic pressure to the hydraulic motor can be connected together via a hydraulic pipe, and can be thereby mounted separately from each other. Thus, the reciprocating pump having no electric device and no speed reduction mechanism can be easily installed in a gas hazardous area.

A gas-fired engine according to a second aspect of the present invention is a gas-fired engine for a high-pressure gas injection diesel engine including a gas fuel supply device that boosts a pressure of liquefied gas as fuel gas to a high pressure and supplies the fuel gas into a combustion chamber by injection, wherein the gas fuel supply device includes: a reciprocating pump that is driven by a hydraulic motor to boost a pressure of liquefied gas introduced thereto to a desired pressure and discharge the liquefied gas; a hydraulic pump unit that supplies a driving hydraulic pressure to the hydraulic motor from a hydraulic pump driven by a rotating shaft of an exhaust turbine, the exhaust turbine being operated by extracting a portion of exhaust gas from an engine exhaust static-pressure pipe; a heating unit that heats and gasifies the boosted liquefied gas supplied from the reciprocating pump; a control section that adjusts a rotational speed of the hydraulic motor to maintain constant a gas fuel outlet pressure of the heating unit; and an engine inlet gas pressure reducing valve that regulates a pressure of gas fuel to be injected into the combustion chamber.

In the gas-fired engine according to the second aspect, the gas fuel supply device includes: the reciprocating pump that is driven by the hydraulic motor to boost the pressure of liquefied gas introduced thereto to a desired pressure and discharge the liquefied gas; the hydraulic pump unit that supplies the driving hydraulic pressure to the hydraulic motor from the hydraulic pump driven by the exhaust turbine, the exhaust turbine being operated by extracting a portion of exhaust gas from the engine exhaust static-pressure pipe; the heating unit that heats and gasifies the boosted liquefied gas supplied from the reciprocating pump; the control section that adjusts the rotational speed of the hydraulic motor to maintain constant the gas fuel outlet pressure of the heating unit; and the engine inlet gas pressure reducing valve that regulates the pressure of gas fuel to be injected into the combustion chamber. Accordingly, the hydraulic pump unit is driven by effectively using the exhaust gas which is generated in a larger amount with an increase in engine load. The pressure of the liquefied gas can be boosted by the reciprocating pump driven by the hydraulic motor. In this case, the amount of exhaust gas increases with the increase in engine load. For the reciprocating pump for boosting the pressure of liquefied gas in which a higher flow rate and a higher pressure are required when the consumption of fuel (gasified liquefied gas) increases, the hydraulic pump driven by the exhaust turbine is a favorable hydraulic power source.

The pressure of the liquefied gas can be also boosted by the reciprocating pump driven by the hydraulic motor with a minimum number of additional devices.

A gas-fired engine according to a third aspect of the present invention is a gas-fired engine for a high-pressure gas injection diesel engine including a turbocharger, and a gas fuel supply device that boosts a pressure of liquefied gas as fuel gas to a high pressure and supplies the fuel gas into a combustion chamber by injection, wherein the gas fuel supply device includes: a reciprocating pump that is driven by a hydraulic motor to boost a pressure of liquefied gas introduced thereto to a desired pressure and discharge the liquefied gas; a hydraulic pump unit that supplies a driving hydraulic pressure to the hydraulic motor from a hydraulic pump driven by a rotating shaft of the turbocharger; a heating unit that heats and gasifies the boosted liquefied gas supplied from the reciprocating pump; a control section that adjusts a rotational speed of the hydraulic motor to maintain constant a gas fuel outlet pressure of the heating unit; and an engine inlet gas pressure reducing valve that regulates a pressure of gas fuel to be injected into the combustion chamber.

In the gas-fired engine according to the third aspect, the gas fuel supply device includes: the reciprocating pump that is driven by the hydraulic motor to boost the pressure of liquefied gas introduced thereto to a desired pressure and discharge the liquefied gas; the hydraulic pump unit that supplies the driving hydraulic pressure to the hydraulic motor from the hydraulic pump driven by the rotating shaft of the turbocharger; the heating unit that heats and gasifies the boosted liquefied gas supplied from the reciprocating pump; the control section that adjusts the rotational speed of the hydraulic motor to maintain constant the gas fuel outlet pressure of the heating unit; and the engine inlet gas pressure reducing valve that regulates the pressure of gas fuel to be injected into the combustion chamber. Accordingly, the hydraulic pump unit is driven by effectively using the exhaust gas which is generated in a larger amount with an increase in engine load. The pressure of the liquefied gas can be boosted by the reciprocating pump driven by the hydraulic motor. In this case, the amount of exhaust gas increases with the increase in engine load. For the reciprocating pump for boosting the pressure of liquefied gas in which a higher flow rate and a higher pressure are required when the consumption of fuel (gasified liquefied gas) increases, the hydraulic pump driven by the exhaust turbine is a favorable hydraulic power source.

The pressure of the liquefied gas can be also boosted by the reciprocating pump driven by the hydraulic motor with a minimum number of additional devices.

In the gas-fired engine according to the second or third aspect, in the gas fuel supply device, the hydraulic pump may be a variable capacity pump, and the control section may adjust the rotational speed of the hydraulic motor by variable capacity control of the hydraulic pump to maintain constant the gas fuel outlet pressure. Accordingly, the rotational speed of the hydraulic motor that drives the reciprocating pump is adjusted by performing capacity control (oil control) of the hydraulic pump. It is thus not necessary to provide a speed reduction mechanism or control the number of rotations of an electric motor. As preferable variable capacity control in this case, for example, a swash plate pump may be employed as the hydraulic pump, and the angle of the swash plate may be appropriately adjusted to control the pump discharge rate.

The reciprocating pump driven by the hydraulic motor, and the hydraulic pump unit that supplies the hydraulic pressure to the hydraulic motor can be connected together via a hydraulic pipe, and can be thereby mounted separately from each other. Thus, the reciprocating pump having no electric device and no speed reduction mechanism can be easily installed in a gas hazardous area.

In the gas-fired engine according to the second aspect, in the gas fuel supply device, the hydraulic pump may be a constant capacity pump, and the control section may adjust the rotational speed of the hydraulic motor by rotation number control of the exhaust turbine to maintain constant the gas fuel outlet pressure. In this case, an exhaust gas flow control valve may be provided on an inlet side of the exhaust turbine, and the opening degree of the valve may be appropriately adjusted to control the number of rotations of the exhaust turbine.

Accordingly, the rotational speed of the hydraulic motor that drives the reciprocating pump is adjusted by controlling the number of rotations of the exhaust turbine on the drive side. It is thus not necessary to provide a speed reduction mechanism or control the number of rotations of an electric motor. The reciprocating pump driven by the hydraulic motor, and the hydraulic pump unit that supplies the hydraulic pressure to the hydraulic motor can be connected together via a hydraulic pipe, and can be thereby mounted separately from each other. Thus, the reciprocating pump having no electric device and no speed reduction mechanism can be easily installed in a gas hazardous area.

Advantageous Effects of Invention

The above gas-fired engine according to the present invention can supply liquefied gas (e.g., LNG) as fuel by boosting the pressure of liquefied gas to a high pressure by the reciprocating pump that is driven by the hydraulic motor and can be easily arranged in a gas hazardous area in the high-pressure gas injection diesel engine, such as an electronically-controlled slow-speed two-stroke diesel engine with high-pressure gas injection, which supplies high-pressure fuel gas (e.g., natural gas) into the combustion chamber.

Since the hydraulic pressure is supplied from the electronic control unit on the engine side, it is not necessary to install a new hydraulic unit for supplying the hydraulic pressure to the hydraulic motor that drives the reciprocating pump. Consequently, the installation space and the cost of the gas-fired engine can be reduced. Especially in a vessel with limited space, the space within the vessel can be effectively used by increasing a cargo space or the like.

In the method for driving the hydraulic pump by use of the shaft output of the exhaust turbine or the turbocharger operated with exhaust gas, the number of devices constituting the hydraulic unit that supplies the hydraulic pressure to the hydraulic motor for driving the reciprocating pump can be minimized. Consequently, the installation space and the cost of the gas-fired engine can be reduced. Especially in a vessel with limited space, the space within the vessel can be effectively used by increasing a cargo space or the like.

DESCRIPTION OF EMBODIMENTS

In the following, one embodiment of a gas-fired engine according to the present invention will be described based on the drawing.

First Embodiment

Figure 1:
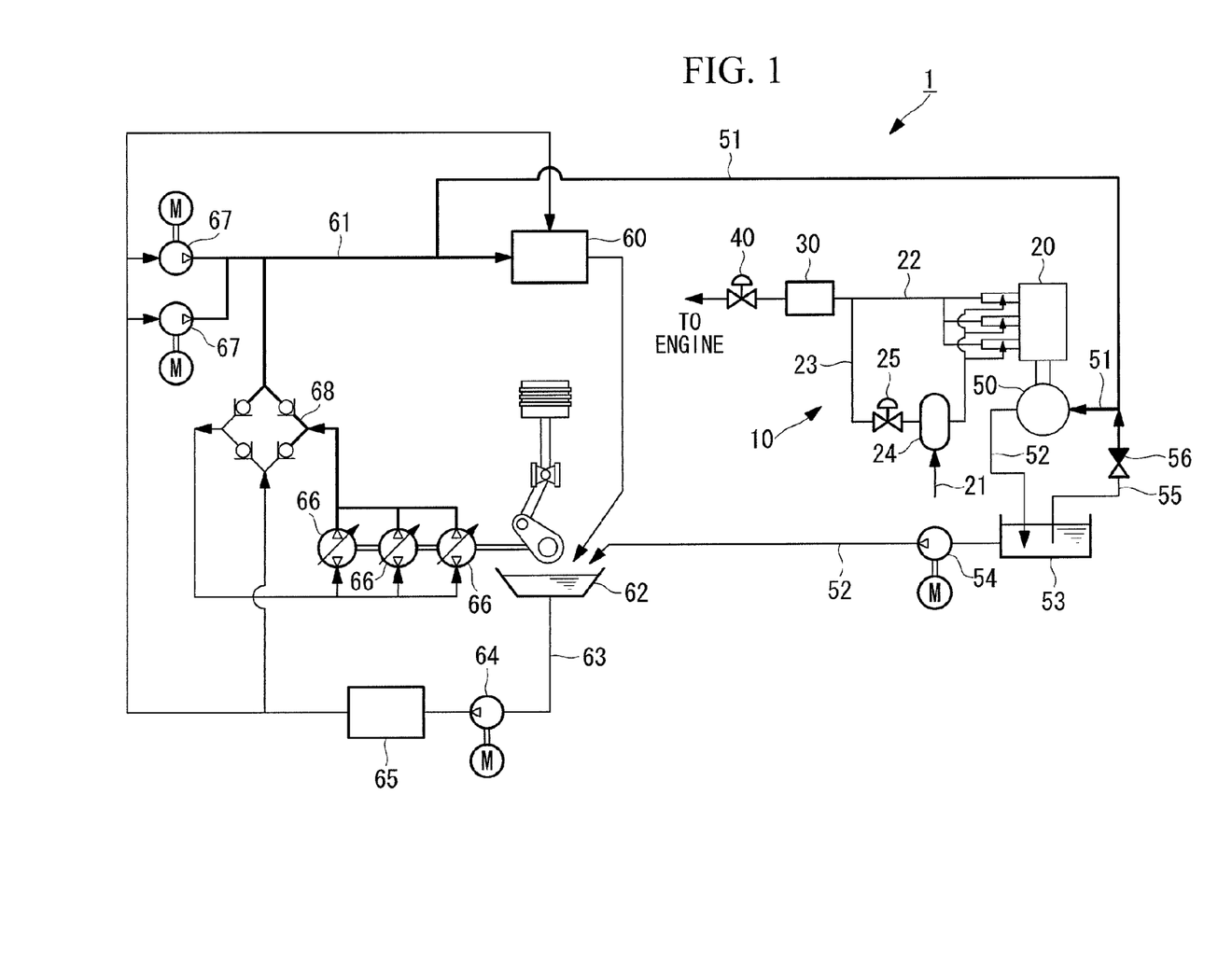
FIG. 1 is a system diagram illustrating a first embodiment of a gas-fired engine as one embodiment of the present invention.

A gas-fired engine 1 according to the embodiment shown in FIG. 1 is a high-pressure gas injection diesel engine including an electronic control unit 60 that drives an engine by controlling high-pressure hydraulic oil by a controller and an electromagnetic valve, and a gas fuel supply device 10 that boosts the pressure of liquefied gas as fuel gas to a high pressure and supplies the fuel gas into a combustion chamber of the engine by injection.

The electronic control unit 60 described below electronically controls the driving of at least one of a fuel injection system, an exhaust valve train system, a start-up system, and a cylinder lubrication system of the gas-fired engine 1, which are driven by a camshaft in conventional engines.

The gas fuel supply device 10 with "high-pressure mode" is provided in the gas-fired engine 1 in the drawing. In the "high-pressure mode", fuel gas obtained by gasifying liquefied gas is supplied into the combustion chamber of the high-pressure gas injection diesel engine by injection. As a specific example of the gas-fired engine 1 according to the present embodiment, the high-pressure gas injection diesel engine is a slow-speed two-stroke diesel engine with high-pressure gas injection (referred to as "SSD-GI" below).

Although the liquefied gas is liquefied natural gas (referred to as "LNG" below) and the fuel gas is natural gas obtained by gasifying the LNG in the following description, the engine and the device according to the present embodiment may be applied to an engine which uses liquefied gas such as liquefied petroleum gas (LPG) as fuel.

The gas fuel supply device 10 includes an LNG fuel system, a hydraulic system, and a control section (not shown). The LNG fuel system supplies the natural gas obtained by gasifying the LNG after boosting the pressure in a reciprocating pump 20, into the combustion chamber of the high-pressure gas injection engine by injection. The hydraulic system supplies a hydraulic pressure to a hydraulic motor 50 that drives the reciprocating pump 20. The control section controls the hydraulic motor 50 or the like. Although one set of LNG fuel system and hydraulic system is shown in the configuration example in the drawing, the present invention is not limited thereto, and a plurality of sets coupled together may be employed.

The LNG fuel system includes the reciprocating pump 20 driven by the hydraulic motor 50. The reciprocating pump 20 is a pump that introduces the LNG having a substantially atmospheric pressure, boosts the pressure of the LNG to a desired pressure, and discharges the LNG.

An LNG supply pipe 22 is connected to the discharge side of the reciprocating pump 20. The LNG supply pipe 22 includes a heating unit 30, and an engine inlet gas pressure reducing valve (referred to as "gas pressure reducing valve" below) 40, which are sequentially arranged from the pump side.

The heating unit 30 is a unit that heats and gasifies the boosted LNG supplied from the reciprocating pump 20. That is, the high-pressure LNG flowing into the heating unit 30 is heated within the unit to flow out as the natural gas obtained by gasifying the LNG.

A pressure sensor (not shown) is provided adjacent to an outlet of the heating unit 30. A natural gas outlet pressure PV detected by the pressure sensor is input to the control section as a gas fuel outlet pressure. The control section adjusts the rotational speed of the hydraulic motor 50 described below so as to maintain the natural gas outlet pressure PV at a predefined constant pressure value. The control section may be provided integrally with a control section of the electronic control unit 60 described below.

The natural gas supplied from the heating unit 30 is adjusted to a desired pressure by the gas pressure reducing valve 40, and then supplied into the high-pressure combustion chamber by injection. That is, the injection (supply) pressure of the natural gas regulated by the gas pressure reducing valve 40 needs to be higher than the pressure within the combustion chamber so as to inject the natural gas into the combustion chamber which is compressed to a high pressure by a piston. An operation mode in which the natural gas is injected into the combustion chamber at high pressure as described above is called "high-pressure mode". In the case of the SSD-GI, the injection pressure of the natural gas in the high-pressure mode is generally 150 to 300 bar.

The gas pressure reducing valve 40 has a "low-pressure mode" in which the natural gas as gas fuel is supplied as the fuel of a gas-spark Otto-cycle engine in addition to the above "high-pressure mode". The "low-pressure mode" is used when the gas fuel is supplied to a generator engine or the like that generates electricity for a vessel, and employs a lower pressure than that of the "high-pressure mode".

The LNG supply pipe 22 includes a recirculation line 23 that branches therefrom upstream of the heating unit 30. The recirculation line 23 is a pipe line that branches the LNG boosted in the reciprocating pump 20 from the upstream side of the heating unit 30 into a suction drum 24. A recirculation control valve 25 as a flow regulating valve is provided upstream of the suction drum 24. An LNG introduction pipe 21 connected to the suction drum 24 is connected to an unillustrated LNG tank or the like.

Since the recirculation line 23 is provided, the recirculation flow rate of the LNG flowing through the recirculation line 23 can be controlled by adjusting the opening degree of the flow regulating valve 25 so as to reduce the LNG flow rate in a low-speed region in which the rotational speed of the hydraulic motor 50 cannot be controlled or in time of emergency.

Figure 4:
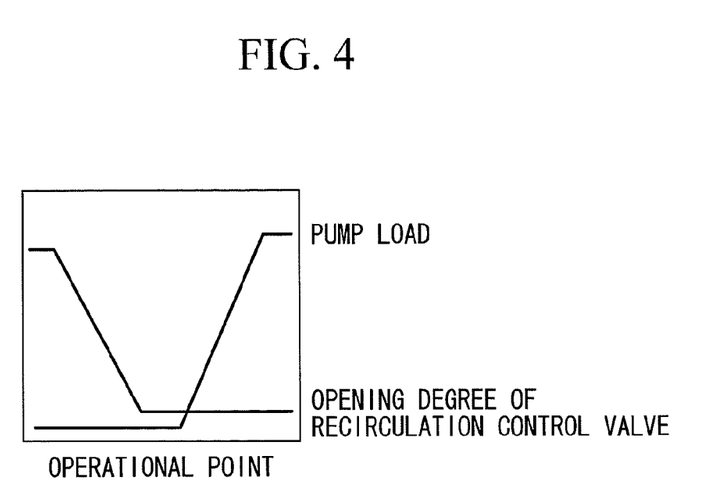
FIG. 4 is an explanatory view showing the pump load of a reciprocating pump and the opening degree of a recirculation control valve (RCV) on a vertical axis with an operational point (OP) on a horizontal axis.

To be more specific, the recirculation flow rate is ensured by increasing the opening degree of the recirculation control valve 25 in a low-speed region with small pump load, for example, as shown in the explanatory view in FIG. 4. That is, the total flow rate of the LNG flowing through the reciprocating pump 20 is ensured by increasing the recirculation flow rate at an operational point OP with small pump load. The hydraulic motor 50 is thereby maintained within a rotation number region in which the hydraulic motor 50 can be controlled. When the LNG rate is reduced in time of emergency, the supply to the heating unit 30 may be limited by increasing the opening degree of the recirculation control valve 25 to cause the LNG to bypass the heating unit 30 and thereby increase the recirculation flow rate.

The suction drum 24 is an LNG container that collects the LNG branched and introduced from the LNG supply pipe 22, and returns the LNG to a recirculation suction section of the reciprocating pump 20. The recirculation flow rate of the LNG introduced into the recirculation line 23 is regulated by the recirculation control valve 25 that operates based on a control signal for the operational point OP output from the control section. The control signal for the operational point OP is an opening signal that defines the operational point output from the control section based on a setting point SP obtained from the number of rotations of the engine, and the natural gas outlet pressure PV detected by the pressure sensor.

The setting point SP in this case may employ a variable value, such as a highly-controllable pressure value of the gas pressure reducing valve 40, in addition to the number of rotations of the engine, or may be a fixed value.

The hydraulic system in this case introduces a portion of hydraulic pressure held by the electronic control unit 60, and supplies the hydraulic pressure to the hydraulic motor 50 that drives the reciprocating pump 20. That is, the hydraulic system includes a hydraulic oil introduction line 51 that introduces a portion of high-pressure hydraulic oil from a hydraulic oil line 61 of the electronic control unit 60, supplies the high-pressure hydraulic oil to the hydraulic motor 50, and thereby drives the hydraulic motor 50, and a hydraulic oil return line 52 that returns the high-pressure hydraulic oil used for driving the hydraulic motor 50 to the hydraulic oil line 61.

The hydraulic oil line 61 of the electronic control unit 60 uses a portion of engine lubricant oil stored in a crankcase 62 as the high-pressure hydraulic oil.

The engine lubricant oil in the crankcase 62 is supplied to a filter unit 65 by an electric lubricant oil pump 64 provided in a lubricant oil line 63. After foreign matter is removed from the engine lubricant oil by the filter unit 65, the pressure of the engine lubricant oil is boosted by an engine drive pump 66 or an electric pump 67 to obtain the high-pressure hydraulic oil. The high-pressure hydraulic oil is thereby supplied to the hydraulic oil line 61. In this case, the electric pump 67 described above is required at the time of engine start up. The engine drive pump 66 is mainly used to supply the hydraulic pressure at the time of normal operation after the engine start up.

A changeover valve block 68 that changes a pump suction direction and a pump discharge direction in reverse operation of the gas-fired engine 1 is provided between the engine drive pump 66 driven in the gas-fired engine 1 and the hydraulic oil line 61.

The hydraulic oil introduction line 51 is a pipe line that branches from the hydraulic oil line 61 upstream of the electronic control unit 60, and supplies a portion of the high-pressure hydraulic oil to the hydraulic motor 50.

The hydraulic oil return line 52 is a pipe line that returns the high-pressure hydraulic oil used for driving the hydraulic motor 50 to the hydraulic oil line 61. A sub-storage tank 53 that temporarily stores the high-pressure hydraulic oil used for driving the hydraulic motor 50 is provided in the hydraulic oil return line 52. The hydraulic fluid stored in the sub-storage tank 53 is returned to the crankcase 62 through the hydraulic oil return line 52 by operating an electric oil return pump 54.

Reference numeral 55 in the drawing denotes a pipe line that connects the hydraulic oil introduction line 51 and the sub-storage tank 53, and reference numeral 56 denotes a check valve provided in the pipe line 55. Since the pipe line 55 and the check valve 56 are provided, the hydraulic oil introduction line 51 can be prevented from coming under negative pressure by sucking the hydraulic fluid from the sub-storage tank 53 in case of an emergency stop of the engine or the like.

As described above, in the gas fuel supply device 10 according to the present embodiment, the pressure of the LNG is boosted by the reciprocating pump 20 driven by the hydraulic motor 50 by effectively using the high-pressure hydraulic oil of the electronic control unit 60 provided in the gas-fired engine 1 without newly providing a hydraulic supply system (a hydraulic pump or the like) for driving the hydraulic motor 50. Accordingly, in the gas fuel supply device 10 according to the present embodiment, the number of additional devices can be minimized by commonly using the hydraulic facility of the electronic control unit 60 in the hydraulic system required in supplying the LNG as engine fuel.

The gas-fired engine 1 as described above can change the number of rotations of the engine to any number based on a vessel speed within a vessel. For example, the number of rotations of the engine increases with an increase in engine load. Thus, the engine drive pump 66 that supplies the high-pressure hydraulic oil to the electronic control unit 60 also has a higher discharge rate and a higher hydraulic pressure. For the reciprocating pump 20 for boosting the pressure of liquefied gas in which a higher flow rate and a higher pressure are required when the consumption of gas fuel obtained by gasifying the LNG increases, the high-pressure hydraulic oil of the electronic control unit 60 is a favorable hydraulic power source.

In other words, the rotational speed of the hydraulic motor 50 that drives the reciprocating pump 20 can be controlled by performing capacity control (oil control) of the engine drive pump 66 that supplies the high-pressure hydraulic oil to the electronic control unit 60, that is, by adjusting the discharge rate of the engine drive pump 66. It is thus not necessary to provide a speed reduction mechanism or control the number of rotations of an electric motor. In this case, a variable capacity pump such as a plunger pump may be employed as the engine drive pump 66, and the plunger inclination angle may be adjusted to control the discharge rate.

The LNG discharge rate of the reciprocating pump 20 can be controlled by the number of rotations and the hydraulic pressure of the hydraulic motor 50. Accordingly, the LNG supply to the heating unit 30 can be easily controlled (increased or decreased) in conjunction with an increase or a decrease in the supply and the hydraulic pressure of the high-pressure hydraulic oil in association with variation in engine load.

The reciprocating pump 20 driven by the hydraulic motor 50, and the engine drive pump 66 as a hydraulic pump unit that supplies the hydraulic pressure to the hydraulic motor 50 are connected together via the hydraulic pipes of the hydraulic oil introduction line 51 and the hydraulic oil return line 52. That is, the reciprocating pump 20 driven by the hydraulic motor 50 and the engine drive pump 66 as the hydraulic power supply source can be connected together by the hydraulic oil introduction line 51 and the hydraulic oil return line 52, and can be thereby mounted separately from each other. Thus, the reciprocating pump 20 having no electric device and no speed reduction mechanism can be easily installed in a gas hazardous area.

Since the hydraulic pressure is supplied from the main engine of a vessel, it is not necessary to drive a power-generating four-stroke engine having lower thermal efficiency than the main two-stroke engine so as to supply driving electricity to the separately-mounted hydraulic unit. Thus, the operating cost can be reduced.

Second Embodiment

Next, a gas-fired engine according to a second embodiment of the present invention will be described based on FIG. 2. The same portions as those of the aforementioned embodiment are assigned the same reference numerals, and the detailed description is omitted.

Figure 2:
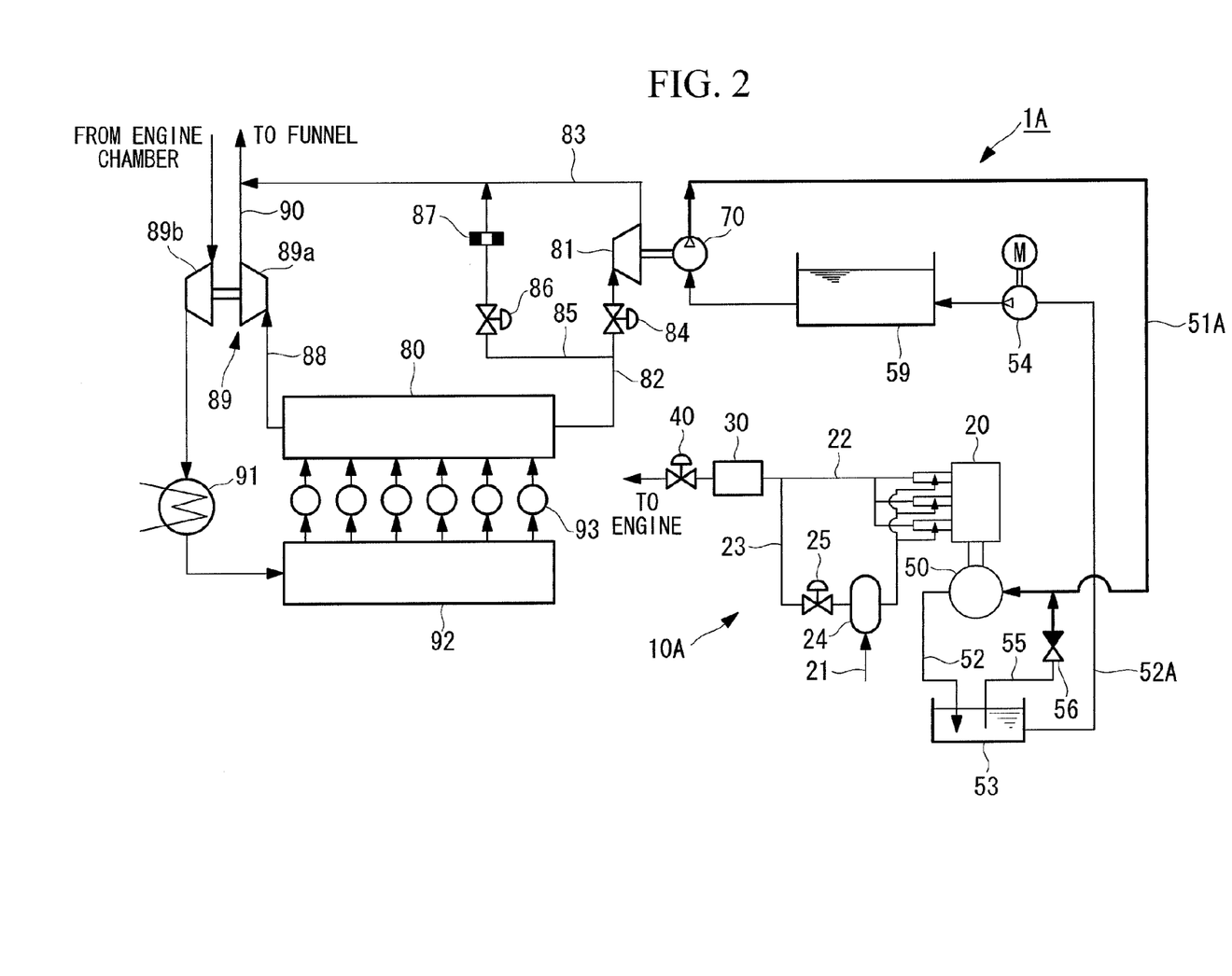
FIG. 2 is a system diagram illustrating a second embodiment of the gas-fired engine as one embodiment of the present invention.

A gas-fired engine 1A according to the embodiment shown in FIG. 2 includes a gas fuel supply device 10A having a different configuration from that of the aforementioned embodiment. In the gas fuel supply device 10A, while the LNG fuel system has substantially the same configuration as that of the aforementioned embodiment, the hydraulic system that supplies the hydraulic pressure to the hydraulic motor 50 has a different configuration.

The hydraulic system in this case drives a hydraulic pump 70 of the hydraulic pump unit that supplies the driving hydraulic pressure to the hydraulic motor 50 by effectively using exhaust gas of the gas-fired engine 1A. The hydraulic pump 70 is a variable capacity pump that uses as a drive source an exhaust turbine 81 operated by extracting a portion of exhaust gas from an engine exhaust static-pressure pipe 80. For example, the hydraulic pump 70 is a plunger pump.

An exhaust gas supply flow passage 82 that introduces a portion of the exhaust gas from the engine exhaust static-pressure pipe 80, and an exhaust gas discharge flow passage 83 that guides the exhaust gas working in the exhaust turbine 81 to a funnel for release to the atmosphere are connected to the exhaust turbine 81.

An exhaust gas flow control valve 84 is provided in the exhaust gas supply flow passage 82 so as to regulate the flow rate of the exhaust gas supplied to the exhaust turbine 81 when needed. An exhaust gas bypass flow passage 85 that branches from the exhaust gas supply flow passage 82 upstream of the exhaust gas flow control valve 84 is also provided in the exhaust gas supply flow passage 82. The exhaust gas bypass flow passage 85 is connected to the exhaust gas discharge flow passage 83. A bypass flow regulating valve 86 and an orifice 87 are provided in the exhaust gas bypass flow passage.

The main stream of the exhaust gas discharged from the engine exhaust static-pressure pipe 80 passes through a main exhaust gas supply flow passage 88 to be supplied to an exhaust turbine 89a of a turbocharger 89. The exhaust gas main stream is guided to the funnel through a main exhaust gas discharge flow passage 90 after driving the exhaust turbine 89a. The above exhaust gas discharge flow passage 83 is connected to the main exhaust gas discharge flow passage 90.

In the turbocharger 89, a compressor 89b driven by a rotating shaft of the exhaust turbine 89a suctions and compresses air within an engine chamber. The compressed air for aeration (scavenging) compressed by the compressor 89b is cooled in an air cooler 91 to increase the air density. The air is thereby supplied to an intake manifold 92.

Reference numeral 93 in the drawing denotes a cylinder of the gas-fired engine 1A. Although the gas-fired engine 1A has six cylinders in the configuration example in the drawing, the present invention is not limited thereto.

Since the gas-fired engine 1A effectively uses the exhaust gas to be released to the atmosphere as the hydraulic power supply source of the gas fuel supply device 10A, the hydraulic pressure can be supplied to the hydraulic motor 50 by operating the hydraulic pump 70.

The high-pressure hydraulic oil discharged from the hydraulic pump 70 is supplied to the hydraulic motor 50 through a hydraulic oil introduction line 51A. The hydraulic fluid flowing into the sub-storage tank 53 after driving the hydraulic motor 50 is returned to a hydraulic fluid storage tank 59 by use of the electric oil return pump 54.

In the gas-fired engine 1A according to the present embodiment, the gas fuel supply device 10A includes the hydraulic pump 70 of the hydraulic pump unit that supplies the driving hydraulic pressure to the hydraulic motor 50 from the hydraulic pump 70 driven by the exhaust turbine 81, the exhaust turbine 81 being operated by extracting a portion of the exhaust gas from the engine exhaust static-pressure pipe 80. Accordingly, the hydraulic pump 70 is driven by effectively using the exhaust gas which is generated in a larger amount with an increase in engine load. The pressure of the LNG can be boosted by the reciprocating pump 20 driven by the hydraulic motor.

In this case, when the engine load increases, the consumption of natural gas (engine fuel) obtained by gasifying the LNG increases, and the amount of exhaust gas also increases. Thus, a higher flow rate and a higher pressure are required for the LNG in the reciprocating pump 20. For the reciprocating pump 20 for boosting the pressure of LNG as described above, the hydraulic pump 70 driven by the exhaust turbine 81 is a favorable hydraulic power supply source since variation in required fuel and variation in hydraulic pressure to be supplied to the hydraulic motor 50 that drives the reciprocating pump 20 on the fuel supply side show substantially the same tendency.

The hydraulic system according to the above embodiment can boost the pressure of the liquefied gas by the reciprocating pump 20 driven by the hydraulic motor 50 with a minimum number of additional devices.

In the gas fuel supply device 10A according to the aforementioned embodiment, the hydraulic pump 70 is preferably a variable capacity pump, and the unillustrated control section preferably adjusts the rotational speed of the hydraulic motor 50 by performing variable capacity control of the hydraulic pump 70 to maintain constant the gas fuel outlet pressure of the natural gas (gas fuel) to be supplied from the gas pressure reducing valve 40 to the gas-fired engine 1A.

By the variable capacity control as described above, the rotational speed of the hydraulic motor 50 that drives the reciprocating pump 20 is adjusted by performing capacity control (oil control) of the hydraulic pump 70. It is thus not necessary to provide a speed reduction mechanism or control the rotation number of an electric motor.

As preferable variable capacity control in this case, for example, a swash plate pump may be employed as the hydraulic pump, and the opening degree of the exhaust gas flow control valve 84 may be fixed and the angle of the swash plate may be appropriately adjusted to control the pump discharge rate.

The gas fuel supply device 10A according to the above embodiment may also employ a modification in which the hydraulic pump 70 is a constant capacity pump, and the unillustrated control section adjusts the rotational speed of the hydraulic motor 50 by performing rotation number control of the exhaust turbine 81 to maintain constant the gas fuel outlet pressure at the gas pressure reducing valve 40. In this case, the number of rotations of the exhaust turbine may be controlled by providing an exhaust gas flow control valve, that is, the flow control valve 84 whose opening degree is adjustable on the inlet side of the exhaust turbine 81, and appropriately adjusting the valve opening degree of the flow control valve 84.

In this case, the rotational speed of the hydraulic motor 50 that drives the reciprocating pump 20 can be also adjusted by controlling the number of rotations of the exhaust turbine on the drive side. It is thus not necessary to provide a speed reduction mechanism or control the rotation number of an electric motor.

The reciprocating pump 20 driven by the hydraulic motor 50, and the hydraulic pump unit (the hydraulic pump 70) that supplies the hydraulic pressure to the hydraulic motor 50 can be connected together via the hydraulic pipe, and can be thereby mounted separately from each other. Thus, the reciprocating pump 20 having no electric device and no speed reduction mechanism can be easily installed in a gas hazardous area.

Since the exhaust gas energy discharged from the main engine of a vessel is effectively used as the hydraulic pressure, it is not necessary to drive a power-generating four-stroke engine having lower thermal efficiency than the main two-stroke engine so as to supply driving electricity to the separately-mounted hydraulic unit. Thus, the operating cost can be reduced.

Third Embodiment

Next, a gas-fired engine according to a third embodiment of the present invention will be described based on FIG. 3. The same portions as those of the aforementioned embodiment are assigned the same reference numerals, and the detailed description is omitted.

Figure 3:
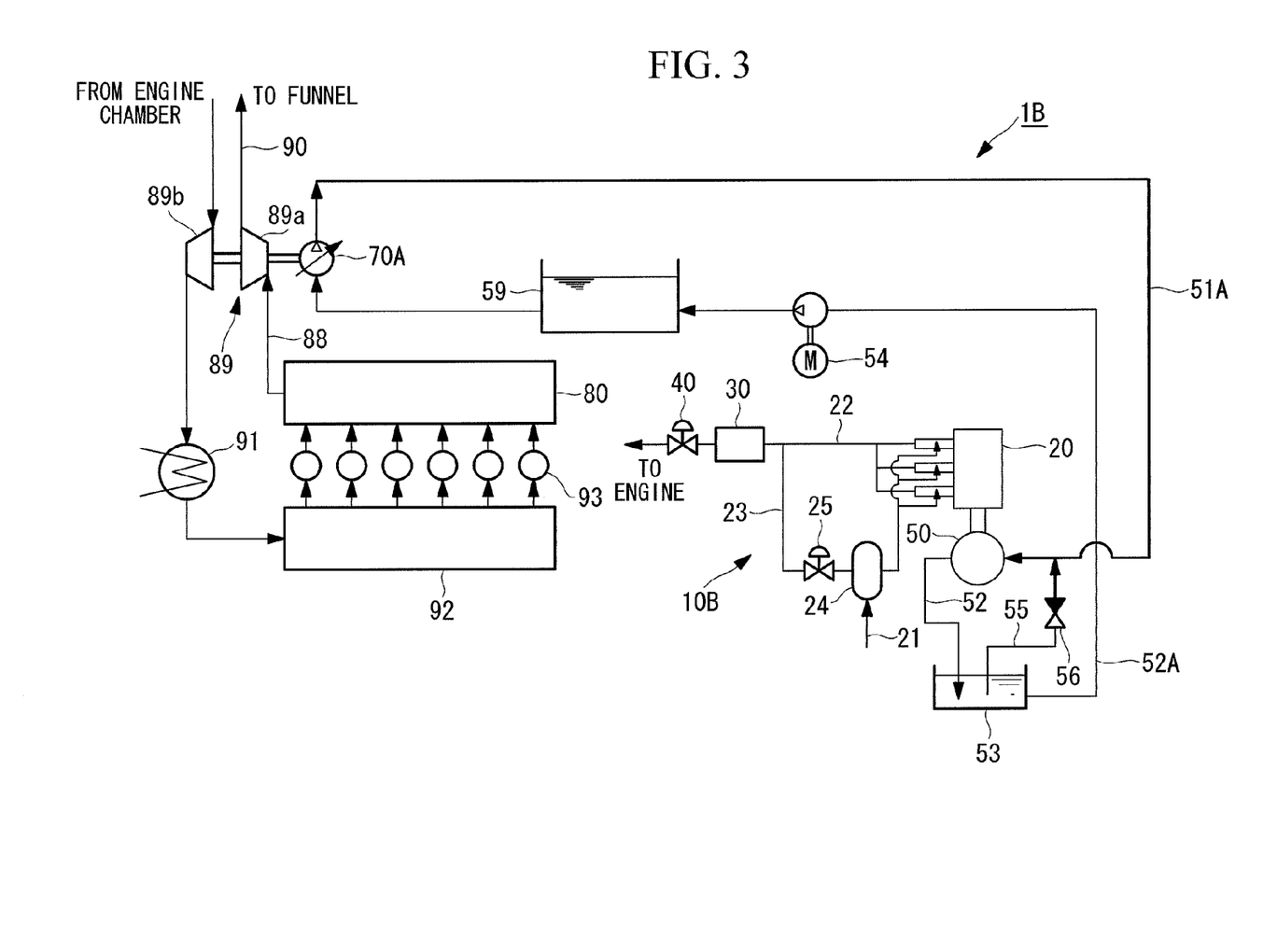
FIG. 3 is a system diagram illustrating a third embodiment of the gas-fired engine as one embodiment of the present invention.

A gas-fired engine 1B according to the embodiment shown in FIG. 3 includes a gas fuel supply device 10B having a different configuration from that of the aforementioned embodiment. In the gas fuel supply device 10B, while the LNG fuel system has substantially the same configuration as that of the aforementioned embodiment, the hydraulic system that supplies the hydraulic pressure to the hydraulic motor 50 has a different configuration.

The hydraulic system in this case drives a hydraulic pump 70A of the hydraulic pump unit that supplies the driving hydraulic pressure to the hydraulic motor 50 by effectively using exhaust gas of the gas-fired engine 1B. The hydraulic pump 70A is a variable capacity pump that is driven by the rotating shaft of the exhaust turbine 89a of the turbocharger 89, the turbocharger 89 being operated with the exhaust gas discharged from the engine exhaust static-pressure pipe 80. For example, the hydraulic pump 70A is a plunger pump.

The main exhaust gas supply flow passage 88 that introduces the exhaust gas from the engine exhaust static-pressure pipe 80, and the main exhaust gas discharge flow passage 90 that guides the exhaust gas working in the exhaust turbine 89a to the funnel for release to the atmosphere are connected to the exhaust turbine 89a.

The exhaust gas discharged from the engine exhaust static-pressure pipe 80 is supplied to the exhaust turbine 89a of the turbocharger 89 through the main exhaust gas supply flow passage 88. The exhaust gas stream is guided to the funnel through the main exhaust gas discharge flow passage 90 after driving the exhaust turbine 89a.

In the turbocharger 89, the compressor 89b driven by the rotating shaft of the exhaust turbine 89a suctions and compresses air within the engine chamber. The compressed air for aeration (scavenging) compressed by the compressor 89b is cooled in the air cooler 91 to increase the air density. The air is thereby supplied to the intake manifold 92.

Reference numeral 93 in the drawing denotes a cylinder of the gas-fired engine 1B. Although the gas-fired engine 1B has six cylinders in the configuration example in the drawing, the present invention is not limited thereto.

The gas-fired engine 1B effectively uses the exhaust gas to be released to the atmosphere as the hydraulic power supply source of the gas fuel supply device 10B. Accordingly, the hydraulic pressure can be supplied to the hydraulic motor 50 by operating the hydraulic pump 70A by the shaft drive of the exhaust turbine 89a of the turbocharger 89, and boosting the pressure of the hydraulic fluid introduced from the hydraulic fluid storage tank 59.

The high-pressure hydraulic oil discharged from the hydraulic pump 70A is supplied to the hydraulic motor 50 through the hydraulic oil introduction line 51A. The hydraulic fluid flowing into the sub-storage tank 53 after driving the hydraulic motor 50 is returned to the hydraulic fluid storage tank 59 by use of the electric oil return pump 54.

In the gas-fired engine 1B according to the present embodiment, the gas fuel supply device 10B includes the hydraulic pump 70A of the hydraulic pump unit that supplies the driving hydraulic pressure to the hydraulic motor 50 from the hydraulic pump 70A driven by the exhaust turbine 89a, the exhaust turbine 89a being operated by introducing the exhaust gas from the engine exhaust static-pressure pipe 80. Accordingly, the hydraulic pump 70A is driven by effectively using the exhaust gas which is generated in a larger amount with an increase in engine load. The pressure of the LNG can be boosted by the reciprocating pump 20 driven by the hydraulic motor.

In this case, when the engine load increases, the consumption of natural gas (engine fuel) obtained by gasifying the LNG increases, and the amount of exhaust gas also increases. Thus, a higher flow rate and a higher pressure are required for the LNG in the reciprocating pump 20. For the reciprocating pump 20 for boosting the pressure of LNG as described above, the hydraulic pump 70A driven by the exhaust turbine 89a is a favorable hydraulic power supply source since variation in required fuel and variation in hydraulic pressure to be supplied to the hydraulic motor 50 that drives the reciprocating pump 20 on the fuel supply side show substantially the same tendency.

The hydraulic system according to the above embodiment can boost the pressure of the liquefied gas by the reciprocating pump 20 driven by the hydraulic motor 50 with a minimum number of additional devices.

In the gas fuel supply device 10B according to the aforementioned embodiment, the hydraulic pump 70A is preferably a variable capacity pump, and the unillustrated control section preferably adjusts the rotational speed of the hydraulic motor 50 by performing variable capacity control of the hydraulic pump 70A to maintain constant the gas fuel outlet pressure of the natural gas (gas fuel) to be supplied from the gas pressure reducing valve 40 to the gas-fired engine 1B.

By the variable capacity control as described above, the rotational speed of the hydraulic motor 50 that drives the reciprocating pump 20 is adjusted by performing capacity control (oil control) of the hydraulic pump 70A. It is thus not necessary to provide a speed reduction mechanism or control the rotation number of an electric motor.

As preferable variable capacity control in this case, for example, a swash plate pump may be employed as the hydraulic pump, and the angle of the swash plate may be appropriately adjusted to control the pump discharge rate.

In this case, the rotational speed of the hydraulic motor 50 that drives the reciprocating pump 20 can be also adjusted by controlling the number of rotations of the exhaust turbine on the drive side. It is thus not necessary to provide a speed reduction mechanism or control the rotation number of an electric motor.

The reciprocating pump 20 driven by the hydraulic motor 50, and the hydraulic pump unit (the hydraulic pump 70A) that supplies the hydraulic pressure to the hydraulic motor 50 can be connected together via the hydraulic pipe, and can be thereby mounted separately from each other. Thus, the reciprocating pump 20 having no electric device and no speed reduction mechanism can be easily installed in a gas hazardous area.

Since the exhaust gas energy discharged from the main engine of a vessel is effectively used as the hydraulic pressure, it is not necessary to drive a power-generating four-stroke engine having lower thermal efficiency than the main two-stroke engine so as to supply driving electricity to the separately-mounted hydraulic unit. Thus, the operating cost can be reduced.

As described above, the gas-fired engines 1, 1A, and 1B according to the present embodiments can supply the liquefied gas (e.g., LNG) as fuel by boosting the pressure of the liquefied gas to a high pressure by the reciprocating pump 20 that is driven by the hydraulic motor and can be easily arranged in a gas hazardous area in the high-pressure gas injection diesel engine, such as an electronically-controlled slow-speed two-stroke diesel engine with high-pressure gas injection, which supplies high-pressure natural gas as fuel into the combustion chamber.

Since the hydraulic pressure is supplied from the electronic control unit 60 on the engine side, it is not necessary to install a new hydraulic unit for supplying the hydraulic pressure to the hydraulic motor 50 that drives the reciprocating pump. Consequently, the installation space and the cost of the gas-fired engine 1 can be reduced. Especially in a vessel with limited space, the space within the vessel can be effectively used by increasing a cargo space or the like.

In the method for driving the hydraulic pumps 70 and 70A by use of the shaft output of the exhaust turbine 81 or the turbocharger 89 operated with the exhaust gas as in the gas-fired engines 1A and 1B, the number of devices constituting the hydraulic unit that supplies the hydraulic pressure to the hydraulic motor 50 for driving the reciprocating pump can be minimized. Consequently, the installation space and the cost of the gas-fired engines 1A and 1B can be reduced. Especially in a vessel with limited space, the space within the vessel can be effectively used by increasing a cargo space or the like.

The present invention is not limited to the aforementioned embodiments, and may be changed as appropriate without departing from the scope.

REFERENCE SIGNS LIST

1, 1A, 1B Gas-fired engine
10, 10A, 10B Gas fuel supply device
20 Reciprocating pump
21 LNG introduction pipe
22 LNG supply pipe
23 Recirculation line
24 Suction drum
25 Recirculation control valve
30 Heating unit
40 Engine inlet gas pressure reducing valve (gas pressure reducing valve)
50 Hydraulic motor
51,51A Hydraulic oil introduction line
52 Hydraulic oil return line
53 Sub-storage tank
54 Oil return pump
59 Hydraulic fluid storage tank
60 Electronic control unit
61 Hydraulic oil line
62 Crankcase
63 Lubricant oil line
64 Lubricant oil pump
65 Filter unit
66 Engine drive pump
67 Electric pump
70,70A Hydraulic pump
80 Engine exhaust static-pressure pipe
81 Exhaust turbine
82 Exhaust gas supply flow passage
83 Exhaust gas discharge flow passage
84 Exhaust gas flow control valve
88 Main exhaust gas supply flow passage
89 Turbocharger
89*a* Exhaust turbine
89*b* Compressor
90 Main exhaust gas discharge flow passage
91 Air cooler
92 Intake manifold
OP Operational point
RCV Recirculation control valve

The invention claimed is:

1. A gas-fired engine for a high-pressure gas injection engine comprising an electronic control unit that drives an engine by controlling high-pressure hydraulic oil by a controller and an electromagnetic valve, and a gas fuel supply device that boosts a pressure of liquefied gas as fuel gas to a high pressure and supplies the fuel gas into a combustion chamber by injection, wherein the gas fuel supply device includes:
a reciprocating pump that is driven by a hydraulic motor to boost a pressure of liquefied gas introduced thereto to a desired pressure and discharge the liquefied gas;
a hydraulic oil introduction line that introduces a portion of the high-pressure hydraulic oil from a hydraulic oil line of the electronic control unit, supplies the high-pressure hydraulic oil to the hydraulic motor, and thereby drives the hydraulic motor;
a hydraulic oil return line that returns the high-pressure hydraulic oil used for driving the hydraulic motor to the hydraulic oil line;
a heating unit that heats and gasifies the boosted liquefied gas supplied from the reciprocating pump;
a control section that adjusts a rotational speed of the hydraulic motor to maintain constant a gas fuel outlet pressure of the heating unit; and an engine inlet gas pressure reducing valve that regulates a pressure of gas fuel to be injected into the combustion chamber.

2. The gas-fired engine according to claim 1, wherein the rotational speed of the hydraulic motor is controlled by adjusting a discharge rate of a hydraulic pump that supplies the high-pressure hydraulic oil to the electronic control unit.

* * * * *